July 14, 1931.  A. T. POTTER  1,814,261
VEHICLE WINDSHIELD
Filed April 1, 1929
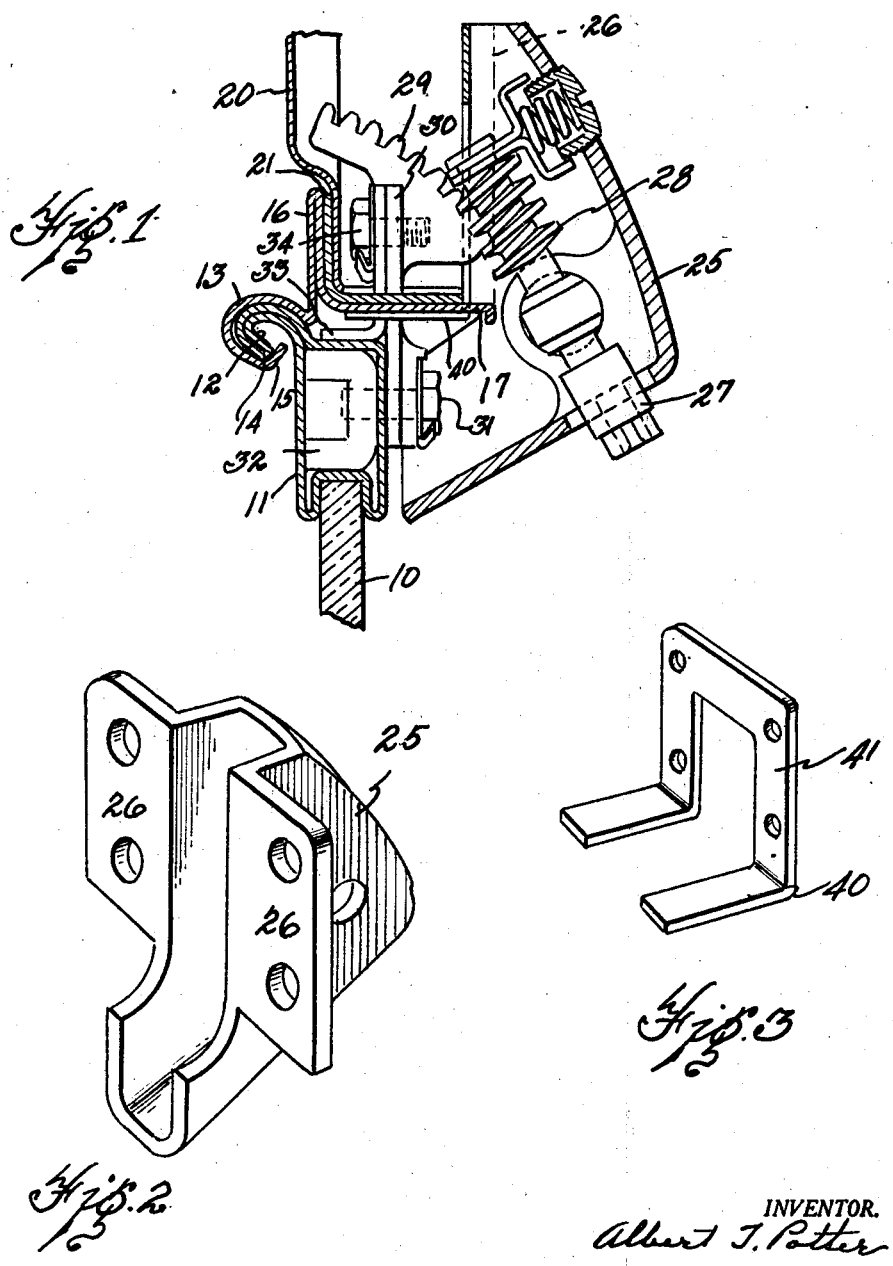
INVENTOR.
Albert T. Potter
BY Francis D. Hardesty
ATTORNEY.

Patented July 14, 1931

1,814,261

UNITED STATES PATENT OFFICE

ALBERT T. POTTER, OF DETROIT, MICHIGAN, ASSIGNOR, BY MESNE ASSIGNMENTS, TO AINSWORTH MANUFACTURING CORPORATION, OF DETROIT, MICHIGAN, A CORPORATION OF MICHIGAN

VEHICLE WINDSHIELD

Application filed April 1, 1929. Serial No. 351,605.

The present invention relates to windshields and operating devices therefor.

Among the objects of the invention is a windshield frame provided with a water and dust proof hinge along its upper edge and an operating device therefor which may readily be assembled therewith and the combination subsequently put in place and secured in operative position, the operating device also serving to permit the hinged panel from becoming displaced.

Other objects will readily occur to those skilled in the art upon reference to the following description and the accompanying drawings in which Fig. 1 is a vertical sectional view through the frame and operator.

Fig. 2 is a perspective view of the operator housing and

Fig. 3 is a perspective view of the locating element.

In the drawings, a windshield panel is indicated at 10 provided with a tubular sheet metal frame of which the top member, indicated at 11, is of a novel form, having the metal forming the front face and top extended outwardly at the corner and bent over to form one member 12 of a hinge.

In forming the panel frame member a strip of metal is bent laterally to tube form by a suitable rolling operation and a strip of metal somewhat wider than is necessary for forming the tube is used. The excess metal is then bent over, preferably at one of the outer corners of the tube, so as to be hook shaped in section with the extremity of the bent portion turned inwardly and approximately at the center of the arc of the hook.

The other hinge member consists of a metal strip having one edge bent over in hook form and of such dimensions as to embrace the hook of the first member and have its extreme edge extending beyond the extreme edge of the first member and turned inwardly of the hook so as to prevent separation of the two members except by relative longitudinal movement.

The hinge member 12 and its cooperating member will preferably extend the full width of the windshield so as to form a tight, dust proof and water-proof hinge for the swinging panel. The other member of the hinge is indicated at 13 and consists of an inverted T-shaped sheet metal member having one edge bent over to envelop the member 12 and embrace it tightly when the panel and consequently, the hinge is in closed position. After the hinge is opened the member 12 will swing about its lower edge 14 upon the edge 15 of the member 13 to produce the hinge effect.

The member 13 is bent upwardly intermediate its width to provide a vertical flange 16 and the other edge is retained in horizontal position somewhat above the level of the point of the edge 14. This latter horizontal edge portion is indicated at 17. The member 13 is secured in any suitable fashion to the top frame member 20 preferably with a strip of felt 21 or other suitable material between the two.

The operator for the panel 10 comprises a triangular housing member 25 provided with laterally extending flanges 26 by means of which it may be bolted to the frame member 20. In the housing member will be mounted a rotatable shaft 27 provided with a worm 28 adapted to cooperate with a gear segment 29. The gear segment is provided with a vertical portion 30 adapted to extend down alongside the tube 11 and be secured thereto by means of a screw 31 passing through the portion 30 into the tube 11 and into a threaded anchor member 32 which may be placed inside of the tube 11. Additional securing means for the gear segment is shown at 33 as consisting of an L-shaped piece welded to the top of tube 10 and extending upwardly in position to receive a screw 34 extending through the member 33 and the portion 30 of the gear segment.

As the housing 25 carrying the shaft 27 is not attached to the gear segment or to the tube of the windshield, it is preferred to assemble the housing and segment portions before bolting the housing to the frame member 20 so that these parts may be properly located with respect to each other. Such assembly is made possible through the use of the reversed L-shaped locating element 40 shown in perspective in Fig. 3. This element will be welded to the member 17 and extends vertically in position to bolt the flanges 26 to the upright portions 41 so as to hold the housing 25 on the shaft in cooperating relation with the segment 29, while the panel 10 is being put in position portions 20 and 41 defining between them a channel. When the panel is in position the housing 25 will, of course, be bolted or otherwise secured to the top frame member 20. In putting the panel 10 in position the two hinge elements 12 and 13 will be slid together longitudinally.

The operation of the device would seem to be entirely obvious from the description of the construction.

Now, having described the invention and the preferred forms of embodiment thereof, it is to be understood that the said invention is to be limited, not to the specific details herein described and illustrated, but only by the scope of the claims which follow.

I claim:—

1. In combination, a stationary element of a vehicle, an elongated hinge element secured thereto along an edge thereof, a windshield, and a frame member secured thereto and having an elongated hinge element integral therewith, and cooperating with the first mentioned hinge element, the first mentioned hinge element including a portion abutting the bottom edge of the stationary element, a portion at right angles thereto fitting against the side of the stationary element of the vehicle, and a hook like portion projecting from the second mentioned hinge element portion.

2. In combination, a stationary element of a vehicle, an elongated hinge element secured thereto along an edge thereof, a windshield, and a frame member secured thereto and having an elongated hinge element integral therewith, and cooperating with the first mentioned hinge element, the first mentioned hinge element including a portion abutting the bottom edge of the stationary element, a portion at right angles thereto fitting against the side of the stationary element of the vehicle, and a hook like portion projecting from the second mentioned hinge element portion, all of said portions being integral with one another.

ALBERT T. POTTER.